United States Patent [19]

Nishiwaki et al.

[11] Patent Number: 4,508,885

[45] Date of Patent: Apr. 2, 1985

[54] ELASTOMER OF ACRYLIC ESTER TYPE COPOLYMER

[75] Inventors: Kenichiro Nishiwaki; Tomio Sakai; Takashi Ohkubo, all of Chiba, Japan

[73] Assignee: Denki Kagaku Kogyo Kabushiki Kaisha, Tokyo, Japan

[21] Appl. No.: 565,354

[22] Filed: Dec. 27, 1983

[30] Foreign Application Priority Data

Dec. 28, 1982 [JP] Japan .................. 57-227382

[51] Int. Cl.³ .................................. C08F 22/20
[52] U.S. Cl. .................................. 526/318; 524/558
[58] Field of Search .................. 526/318; 524/558

[56] References Cited

U.S. PATENT DOCUMENTS 3,278,469 10/1966 Pascale .................. 526/318

Primary Examiner—Paul R. Michl
Assistant Examiner—Alex H. Walker
Attorney, Agent, or Firm—Albert L. Jeffers; Stephen T. Belsheim

[57] ABSTRACT

There is provided an elastomer of acrylic ester type copolymer made up of a monomeric composition comprising; 100 parts by weight of a mixture of (A) 0–50% by weight of a vinyl carboxylate of the formula; $R_1COOCH=CH_2$ wherein $R_1$ is an alkyl group having 1–4 carbon atoms, (B) 0–30% by weight of ethylene and (C) 10–100% by weight of an alkyl acrylate and/or an alkoxyalkyl acrylate; and 2–15 parts by weight of (D) a monoalkoxyalkyl maleate, and which has good curing rate, good processability as well as good storage stability.

17 Claims, No Drawings

ELASTOMER OF ACRYLIC ESTER TYPE COPOLYMER

BACKGROUND OF THE INVENTION

This invention relates to an elastomer of copolymer made up of a vinyl carboxylate, ethylene, an alkyl acrylate and/or an alkoxyalkyl acrylate, and a monoalkoxyalkyl maleate. This invention also relates to vulcanized products of said elastomer.

Heretofore, there have been provided elastomer compositions containing a copolymer made up of a vinyl carboxylate, ethylene, an alkyl acrylate and/or an alkoxyalkyl acrylate, and a monoepoxy monoolefinic compound (e.g. glycidyl methacrylate) as a cure site monomer (cf. U.S. Pat. No. 4,303,560 corresponding to Japanese Patent Kokai Koho Nos. 55-123641 and 55-123611.)

These elastomer compositions can be vulcanized by using a vulcanizing agent such as an aliphatic acid soap/sulfur, polyamines, a carboxylic acid or ammonium salts thereof, and the vulcanized products are improved in the heat resistance, oil resistance and weatherproof as well as mechanical properties. The compositions, however, have unnegligible problems in their curing rate.

That is to say, they often require post cure after the usual vulcanization whereby covering their low curing rate and obtaining a product of desired properties. The post cure, in fact, enables the vulcanized product to have an improved compression set. If the post cure step, however, can be performed in a shorter time or utterly omitted, the vulcanized products may be manufactured more advantageously in a commercial scale. Therefore, elastomers having good vulcanizate properties have long been expected.

Heretofore, there have been reported many studies on new copolymer elastomers and vulcanizing agents therefor to attain more rapid and more effective vulcanizing procedure. For example, U.S. Pat. No. 3,883,472 discloses the fact that faster cures may be attained by using compositions containing elastomeric copolymer made up of an acrylate, ethylene, and a monoester of butenedionic acid. These elastomers of acrylic ester type copolymer using the monoester of butenedionic acid (e.g. monoalkyl maleates) as a cure site monomer have, in fact, faster curing rate. However, they have disadvantageous tendency of scorching (a phenomenon of an early-time vulcanization).

SUMMARY OF THE INVENTION

It is an object of this invention to provide an elastomer of acrylic ester type copolymer exhibiting well accelerated curing rate without tendency of scorching, requiring no post cure or shortened post cure time and having good processability and storage stabilities.

In accordance with this invention, there is provided an elastomer of acrylic ester type copolymer made up of a monomeric composition comprising; 100 parts by weight of a mixture of the following three components, (A) 0-50% by weight of a vinyl carboxylate of the formula, $R_1COOCH=CH_2$ wherein $R_1$ is an alkyl group having 1 to 4 carbon atoms, (B) 0-30% by weight of ethylene and (C) 10-100% by weight of an alkyl acrylate of the formula, $CH_2=CHCOOR_2$ wherein $R_2$ is an alkyl group having 1 to 8 carbon atoms and/or an alkoxyalkyl acrylate of the formula, $CH_2=CHCOOR_3OR_4$ wherein $R_3$ is an alkylene group having 1 to 4 carbon atoms and $R_4$ is an alkyl group having 1 to 4 carbon atoms; and 2-15 parts by weight of (D) a monoalkoxyalkyl maleate of the formula,

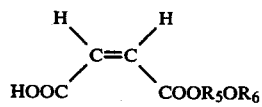

wherein $R_5$ is an alkylene group having 1 to 4 carbon atoms and $R_6$ is an alkyl group having 1 to 4 carbon atoms.

There is also provided a vulcanized product made of the above-mentioned elastomer of acrylic ester type copolymer and improved in the mechanical properties, oil resistance, heat resistance and weatherproof.

DETAILED DESCRIPTION OF THE INVENTION

The vinyl carboxylates used as component (A) are those represented by the above formula and may be exemplified by vinyl acetate and vinyl propionate. When the carboxylate has higher alkyl group, the elastomer obtained becomes unsatisfactory in its oil resistance. In this point of view, vinyl acetate is preferably used as the component (A). If the content of vinyl carboxylate in the mixture of (A), (B) and (C) surpasses 50% by weight, the elastomer becomes unsatisfactory in its low-temperature flexibility. The content of vinyl carboxylate is preferably 0 to 40% by weight, more preferably 0 to 30% by weight.

On the other hand, the amount of ethylene used as component (B) is within the range of 0 to 30% by weight in the mixture of (A), (B) and (C). When the content of ethylene surpasses 30% by weight, the elastomer becomes unsatisfactory in its oil resistance. The content is preferably 0 to 25% by weight, more preferably 0 to 20% by weight.

The component (C), alkyl acrylate and alkoxyalkyl acrylate may be used alone or in combination in an amount of 10 to 100% by weight based on the mixture of (A), (B) and (C). When the alkyl acrylate and alkoxyalkyl acrylate are used in combination, the elastomer composition obtained may have well balanced oil resistance and low-temperature flexibility.

Illustrative examples of the alkyl acrylate are methyl acrylate, ethyl acrylate, propyl acrylate, n-butyl acrylate, n-hexyl acrylate, 2-ethylhexyl acrylate and n-octyl acrylate.

Illustrative examples of the alkoxyalkyl acrylate are methoxymethyl acrylate, methoxyethyl acrylate, ethoxyethyl acrylate, butoxyethyl acrylate and ethoxypropyl acrylate.

The monoalkoxyalkyl maleates used as component (D) are those represented by the above-illustrated formula. Illustrative examples thereof are monomethoxyethyl maleate, monoethoxyethyl maleate, monobutoxyethyl maleate and monomethoxybutyl maleate. The amount of the component (D) used is between 2 and 15 parts by weight per 100 parts of the mixture of (A), (B) and (C).

The monoalkoxyalkyl maleate gives cure sites to the copolymer according to this invention so as to make the vulcanization by a polyfunctional compound (e.g., polyamines) possible and gives good curing rate to the copolymer. When the amount of component (D) is less than 2 parts by weight, sufficient cure sites cannot be formed so that the mechanical strength and compression set of the elastomer get worse. When the amount of compound (D) surpasses 15 parts by weight, the cross-linking density is so tight that good mechanical strength cannot be obtained.

The copolymer according to this invention can be prepared by copolymerizing the above-mentioned monomeric composition of (A) through (D). The copolymerization may be carried out by conventional methods such as emulsion polymerization, suspension polymerization, solution polymerization and bulk polymerization, under the usual conditions. Among these methods, emulsion polymerization is preferably used for the reason that the polymerization rate of monomers is high and high molecular weight polymers can be obtained. Polymerization may be carried out in a batch process or in such a process that monomers are continuously or intermittently added during the operation. Polymerization temperature may be selected from the range of 5° to 80° C., preferably 30°-70° C.

The polymerization reaction may be started using a radical initiator. Illustrative examples of the radical initiator are organic peroxides or hydroperoxides, such as benzoyl peroxide, dicumyl peroxide, t-butyl hydroperoxide, a combination thereof with a Redox type initiator; diazo compounds such as azobisisobutyronitrile; persulfates such as sodium, potassium and ammonium persulfates and a combination thereof with a Redox type initiator.

Representative examples of the emulsifier to be used are anionic, cationic and nonionic surfactants well-known in the art. The reaction of the emulsion polymerization may be carried out by mixing water buffered with inorganic salts and monomers and starting the reaction by use of the radical initiator.

Usually the polymerization is performed till 90% of the monomers react. The thus prepared latex is then coagulated to separate polymeric products. Representative methods for coagulating are coagulation using metal salts such as $CaCl_2$, $MgSO_4$, $Al(OH)_3$, $Na_2SO_4$ and $(NH_4)_2SO_4$ or boron compound such as borax and boric acid, thermal coagulation and freeze coagulation. Thereafter, the thus obtained copolymer is sufficiently washed with water and dried.

The elastomer of copolymers thus obtained has, preferably a Mooney viscosity $(ML_{1+4})$ between 30 and 70 at 100° C. as measured by Mooney Viscometer produced by Shimadzu Corporation.

The thus obtained elastomer of copolymer is compounded while adding various additives which are used in the usual rubber compounding and vulcanized and molded to give the desired rubber products.

The vulcanization is carried out by use of vulcanizing agents in an amount of 0.3-5, preferably 0.5-3 parts by weight per 100 parts by weight of the elastomer. When the amount of the vulcanizing agent used is less than 0.3 parts by weight, the vulcanization reaction cannot be sufficiently performed. When the amount surpasses 5 parts by weight, the overcure takes place.

Preferable examples of the vulcanizing agent are aliphatic and aromatic primary amines. Illustrative examples of the aliphatic primary amine are hexamethylenediamine, hexamethylenediamine carbamate and tetramethylenepentamine. Illustrative examples of the aromatic primary amine are 4,4'-methylenedianiline, 4,4'-oxyphenyldiphenylamine and 4,4'-methylenebis(o-chloroaniline). Preferable vulcanizing agents are hexamethylene carbamate and 4,4'-methylenedianiline.

Illustrative examples of a vulcanization accelerator to be optionally admixed with the elastomer of copolymers are guanidines such as guanidine, tetramethylguanidine, dibutylguanidine, diphenylguanidine and diorthotolylguanidine.

In addition, fillers such as carbon black, silica and surface-treated calcium carbonate are used in an amount of 10-200 parts by weight, preferably 30-100 parts by weight per 100 parts of the elastomer, so as to make the rubber products exhibit the desired practical properties.

A lubricant such as stearic acid, its metal salts and amines (e.g. stearyl amine) is used to adjust the processability and other properties of the composition and, in fact, is improved in processability of two-roll mill.

In addition, the plasticizers and antioxidants may be used.

Illustrative examples of the plasticizers are dialkyl and diallyl organic esters such as diisobutyl, diisooctyl and dibenzyl esters of sebacic acid, azelaic acid and phthalic acid.

Illustrative examples of the antioxidant are amine type antioxidants such as N-phenyl-N'-isopropyl-p-phenylenediamine and phenyl-α-naphthylamine; phenol type antioxidants such as 3,5-di-t-butyl-4-hydroxy toluene, 1,3,5-trimethyl2,4,6-tris(3,5-di-t-butyl-4-hydroxybenzene), octadecyl-3-(3,5-di-t-butyl-4-hydroxyphenyl)propionate and 4,4'-thiobis(6-t-butyl-3-methylphenol) and the like; dithionic acid type antioxidants such as nickel dibutyl dithiocarbamate and dilauryl dithiopropionate; and phosphate type antioxidants such as tris(nonylphenyl)phosphite. These antioxidants may be used alone or in combination thereof. The amount of the antioxidant is 0.5-3 parts by weight, preferably 1 part by weight per 100 parts of the elastomer.

The addition of the above-mentioned additives to the elastomer may be carried out by the conventional compounding procedure as used in the rubber industry.

The elastomers are cured at a temperature from about 120° C. to about 200° C., preferably from about 150° C. to about 180° C. The vulcanization time may be shortened if the vulcanization temperature is elevated and usually determined from the range between 2 and 120 minutes. The curing can be performed in 20 minutes at 170° C. The optional post cure at 150°-200° C. for about 2 to 4 hours may result in well improved compression set.

The thus obtained elastomer composition may be molded by conventional molding methods to give rubber products suitable for uses in which good mechanical properties as well as the good oil resistance, heat resistance and weatherproof are required. The rubber products according to this invention may be used for rubber elements of automotive vehicles and the like such as elements usually contacting with high temperature lubricant oil, such as an oil cooler hose of the powertrain section, oil cooler hose of the stearing section, oilpan-gasket, O-ring, oilseal, packings, fuel hose and airduct hose; exhaust hose of high temperature drier which usually contacts with high temperature air; and the rubber elements used in the field which usually contact with high temperature lubricant oil.

This invention will be illustrated by the following non-limitative Examples.

EXAMPLE 1

The polymer of vinyl acetate, ethylene, n-butyl acrylate, ethyl acrylate and monomethoxyethyl maleate, was prepared by the conventional method of emulsion polymerization using the following formulation:

| | |
|---|---|
| Water | 43.2 kg |
| Vinyl acetate | 7.2 kg |
| Ethyl acrylate | 11.5 kg |
| n-Butyl acrylate | 10.1 kg |
| Ethylene | 5.2 kg |
| Monomethoxyethyl maleate | 2.0 kg |
| Partially saponified polyvinyl alcohol | 1.4 kg |
| SFS[1] | 86.4 g |
| Tartaric acid | 8.64 g |
| Mohr's salt[2] | 4.32 g |
| Sodium acetate | 57.6 g |
| Peroxide[3] | 1.70 l |

Remarks:
[1]Sodium formaldehyde sulfoxalate
[2]Iron (II) ammonium sulfate
[3]0.5% Aqueous solution of t-butylhydroperoxide To a 130 l-volume autoclave were charged 1.4 kg of polyvinylalcohol (hereinunder referred to as PVA), 86.4 g of SFS, 8.64 g of tartaric acid, 4.32 g of Mohr's salt and 57.6 g of sodium acetate which were previously dissolved in 43.2 kg of water. Thereafter, 7.2 kg of vinyl acetate and 1.35 kg of monomethoxyethyl maleate were added and emulsified under stirring. the inside atmosphere of the autoclave was then perfectly replaced with nitrogen gas and 5.2 kg as weighed of ethylene gas was introduced under pressure thereinto. After the reaction temperature was raised to 55° C., a mixture of 11.5 kg of ethyl acrylate, 10.1 kg of n-butyl acrylate and 650 g of monomethoxyethyl maleate as well as a 0.5% aqueous solution of peroxide (t-butylhydroperoxide) were separately added to the reaction mixture over 6 to 10 hours by using the respective inlet port and the polymerization was further proceeded.

The resulting emulsion was coagulated by adding a 10% aqueous solution of $(NH_4)_2SO_4$. The isolated polymer was fully washed with water and dried.

The thus obtained elastomer was compounded in accordance with the below-mentioned recipe by using a 6-in. two-roll mill heated to 40° C. and thereafter subjected to press cure at 170° C. for 20 minutes to obtain a 15 cm square sheet of 2 mm in thickness. The properties of the rubber sheet were measured and the results are shown in Table 1.

| Rubber Recipe | (parts by weight) |
|---|---|
| Rubber | 100 |
| Antioxidant (Tris-(nonylphenyl)phosphite) | 2 |
| Stearic acid | 1 |
| Carbon black HAF | 40 |
| 4,4'-Methylenedianiline | 1 |
| Diphenylguanidine | 2 |

EXAMPLES 2 TO 6

A series of the polymerization procedures was carried out in the same manner as in Example 1, with the exception that the amounts of vinyl acetate, methyl acrylate, ethyl acrylate, n-butyl acrylate and methoxyethyl acrylate were changed as shown in Table 1. The results are shown in Table 1.

Remarks: Measurement methods of the physical properties shown in Table 1 and other Tables mentioned below are as follows:

*1 Mechanical properties: JIS K 6301
  $T_B$: Tensile strength
  $E_B$: Elongation
  $H_S$: Hardness measured by JIS Spring Type Hardness Tester A Type

*2 Heat resistance: JIS 6301 6.3 for samples subjected to heat-aging at 150° C. for 96 hours.
  $A_R(T_B)$: The ratio of residual $T_B$ value measured after the heat-aging based on $T_B$ value measured before the heating.
  $A_R(E_B)$: The ratio of residual $E_B$ value measured after the heat-aging based on $E_B$ value measured before the heating.
  $\Delta H_S$: The difference between $H_S$ value measured after the heat-aging and $H_S$ value measured before the heating.

*3 Compression set: JIS 6301-10 measuring the ratio of residual strain after heat-compression at 150° C. for 70 hours.

*4 Oil resistance: JIS 6301
  $\Delta V$: The ratio (%) of volume increase after soaking into a JIS No. 3 oil at 150° C. for 96 hours.

*5 Low-temperature flexibility: JIS K 6301-19
  $T_{100}$: The temperature at which the modulus angular is 100 times as much as that measured at 23±3° C.

*6 Scorching time: The period in which the compound Mooney increases by 5 points based on the lowest value thereof measured at 125° C. by use of the L-rotor of Mooney viscometer.

EXAMPLES 7 AND 8

A series of the polymerization procedures was carried out in the same manner as in Example 1 using the same reactor, with the exception that ethyl acrylate, n-butyl acrylate and methoxyethyl acrylate were used in the quantities as shown in Table 2 and that the total of the monomers were fed to the reactor at the beginning of the polymerization. The results are shown in Table 2.

EXAMPLE 9

A series of the polymerization procedures was carried out in the same manner as in Example 1, with the exception that ethylene was not used. The results are shown in Table 2.

TABLE 1

| | Example 1 | Example 2 | Example 3 | Example 4 | Example 5 | Example 6 |
|---|---|---|---|---|---|---|
| Feed Composition (parts by weight) | | | | | | |
| Vinyl acetate | 20 | 30 | 25 | 15 | 25 | 20 |
| Methyl acrylate | | | | | | 10 |
| Ethyl acrylate | 35 | 30 | | | | |
| n-Butyl acrylate | 30 | 20 | 30 | | 60 | 55 |
| Methoxyethyl acrylate | | | 30 | 70 | | |
| Ethylene | 15 | 20 | 15 | 15 | 15 | 15 |
| Monomethoxyethyl maleate | 7 | 7 | 7 | 7 | 7 | 7 |

TABLE 1-continued

| Properties[1] | Example 1 | Example 2 | Example 3 | Example 4 | Example 5 | Example 6 |
|---|---|---|---|---|---|---|
| $T_B$ (kg/cm$^2$) | 149 | 180 | 130 | 140 | 125 | 145 |
| $E_B$ (%) | 270 | 310 | 290 | 380 | 250 | 300 |
| $H_S$ | 60 | 68 | 62 | 55 | 58 | 60 |
| Heat resistance[2] | | | | | | |
| $A_R(T_B)$ % | 95 | 96 | 92 | 93 | 97 | 98 |
| $A_R(E_B)$ % | 85 | 93 | 88 | 87 | 89 | 90 |
| $\Delta H_S$ | +10 | +11 | +12 | +12 | +10 | +8 |
| Compression set[3] (%) | 34 | 32 | 31 | 41 | 42 | 40 |
| Oil resistance[4] $\Delta V$ (%) | 31 | 21 | 24 | 6 | 58 | 50 |
| Low-temp. flexibility[5] $T_{100}$ (°C.) | −24 | −15 | −27 | −31 | −31 | −25 |
| Scorching time[6] (ts) | 10 min. 20 sec. | 10 min. 40 sec. | 10 min. | 12 min. 15 sec. | 12 min. 30 sec. | 12 min. |

TABLE 2

| | Example 7 | Example 8 | Example 9 |
|---|---|---|---|
| Feed Composition (parts by weight) | | | |
| Vinyl acetate | | | 20 |
| Ethyl acrylate | 100 | 50 | 40 |
| n-Butyl acrylate | | 25 | 40 |
| Methoxyethyl acrylate | | 25 | |
| Monomethoxyethyl maleate | 7.0 | 7.0 | 7.0 |
| Properties | | | |
| $T_B$ (kg/cm$^2$) | 146 | 152 | 135 |
| $E_B$ (%) | 280 | 310 | 280 |
| $H_S$ | 63 | 63 | 62 |
| Heat resistance | | | |
| $A_R$ ($T_B$) | 85 | 85 | 94 |
| $A_R$ ($E_B$) | 80 | 88 | 85 |
| $\Delta H_S$ | +14 | +16 | +12 |
| Compression set | 46 | 40 | 35 |
| Oil resistance $\Delta V$ | 15 | 20 | 28 |
| Low-temp. flex. $T_{100}$ | −15 | −26 | −20 |
| Scorching time | 11 min. 15 sec. | 10 min. | 9 min. 30 sec. |

COMPARATIVE EXAMPLES 1 THROUGH 6

The polymerization procedures were carried out by using glycidyl methacrylate instead of the monoalkoxyalkyl maleates used in Examples 1 through 9.

To a 130 l-volume autoclave were charged 1.4 g of PVA, 86.4 g of SFS, 2.88 g of ethylenediaminetetraacetic acid (hereinunder referred to as EDTA), 1.44 g of Fe(II)SO$_4$ and 57.6 g of sodium acetate which were previously dissolved in 43.2 kg of water. Thereafter, 7.2 kg of vinyl acetate and 72 g of glycidyl methacrylate (hereinafter referred to as GMA) were added and emulsified under stirring. The inside atmosphere of the autoclave was then perfectly replaced with nitrogen gas and 5.2 kg as weighed of ethylene gas was introduced thereinto under pressure.

After the reaction temperature was raised to 55° C., a mixture of 11.5 kg of ethyl acrylate, 10.1 kg of n-butyl acrylate and 360 g of GMA as well as a 0.5% aqueous solution of ammonium persulfate were separately added to the reaction mixture over 6 to 10 hours by use of the respective inlet ports and the polymerization was further proceeded.

The resulting emulsion was coagulated by adding a 2.5% aqueous solution of borax. The isolated polymer was fully washed with water and dried.

The thus obtained elastomer was compounded in accordance with the below-mentioned recipe by means of a 6-in. two-roll mill heated to 40° C., and thereafter subjected to press vulcanization at 170° C. for 20 minutes to obtain a 15 cm square sheet of 2 mm in thickness. The properties of the rubber sheet were measured and the results are shown in Table 3.

| Rubber Recipe | (parts by weight) |
|---|---|
| Rubber | 100 |
| Antioxidant (nickel dibutyl dithiocarbamate) | 1 |
| Stearic acid | 1 |
| Carbon black HAF | 40 |
| Hexahydrogenated Phthalic anhydride | 0.5 |
| 2-methylimidazole | 0.2 |

TABLE 3

| | Comparative Example 1 | Comparative Example 2 | Comparative Example 3 | Comparative Example 4 | Comparative Example 5 | Comparative Example 6 |
|---|---|---|---|---|---|---|
| Feed Composition (parts by weight) | | | | | | |
| Vinyl acetate | 20 | 30 | 25 | 15 | 25 | 20 |
| Methyl acrylate | | | | | | 10 |
| Ethyl acrylate | 35 | 30 | | | | |
| n-Butyl acrylate | 30 | 20 | 30 | | 60 | 55 |
| Methoxyethyl acrylate | | | 30 | 70 | | |
| Ethylene | 15 | 20 | 15 | 15 | 15 | 15 |
| Glycidyl methacrylate | 1.5 | 1.5 | 1.5 | 1.5 | 1.5 | 1.5 |
| Properties | | | | | | |
| $T_B$ | 113 | 123 | 103 | 91 | 99 | 108 |
| $E_B$ | 710 | 600 | 510 | 620 | 550 | 630 |
| $H_S$ | 57 | 70 | 56 | 45 | 48 | 54 |
| Heat resistance | | | | | | |
| $A_R(T_B)$ | 132 | 141 | 129 | 149 | 126 | 137 |
| $A_R(E_B)$ | 41 | 53 | 57 | 63 | 51 | 49 |
| $\Delta H_S$ | +17 | +14 | +16 | +17 | +22 | +17 |

TABLE 3-continued

|  | Comparative Example 1 | Comparative Example 2 | Comparative Example 3 | Comparative Example 4 | Comparative Example 5 | Comparative Example 6 |
| --- | --- | --- | --- | --- | --- | --- |
| Compression set (%) | 86 | 82 | 78 | 90 | 86 | 82 |
| Oil resistance ΔV (%) | 31 | 21 | 24 | 6 | 58 | 50 |
| Low-temp. flex. T$_{100}$ (°C.) | −24 | −15 | −27 | −31 | −31 | −25 |
| Scorching time (ts) | 11 min. | 11 min. 40 sec. | 13 min. 40 sec. | 19 min. 15 sec. | 12 min. 20 sec. | 12 min. |

COMPARATIVE EXAMPLES 7 AND 8

A series of the polymerization procedures was carried out in the same manner as in Comparative Example 1 using the same reactor, with the exception that ethyl acrylate, n-butyl acrylate and methoxyethyl acrylate were used in the amounts as shown in Table 4, and that the total of the monomers were fed to the reactor at the beginning of the polymerization. The results are shown in Table 4.

COMPARATIVE EXAMPLE 9

A series of the polymerization procedures were carried out in the same manner as in Comparative Example 1, with the exception that ethylene was not used. The results are shown in Table 4.

EXAMPLES 10 THROUGH 12

A series of the polymerization procedures was carried out in the same manner as in Example 1, with the exception that the monoalkoxyalkyl group of the monoalkoxyalkyl maleate used was replaced with the respective groups as shown in Table 5. The results are shown in Table 5.

COMPARATIVE EXAMPLE 10 THROUGH 13

A series of the polymerization procedures was carried out in the same manner as in Example 5, with the exception that the monoalkoxyalkyl group of the monoalkoxyalkyl maleate used was replaced with the respective groups as shown in Table 5. The results were shown in Table 5.

COMPARATIVE EXAMPLES 14 AND 15, EXAMPLES 13 AND 14

A series of the polymerization procedures was carried out in the same manner as in Example 1, with the exception that the amount of monomethoxyethyl maleate was changed as shown in Table 5.

TABLE 4

|  | Comparative Example 7 | Comparative Example 8 | Comparative Example 9 |
| --- | --- | --- | --- |
| Feed Composition (parts by weight) | | | |
| Vinyl acetate |  |  | 20 |
| Ethyl acrylate | 100 | 50 | 40 |
| n-Butyl acrylate |  | 25 | 40 |
| Ethoxyethyl acrylate |  | 25 |  |
| Glycidyl methacrylate | 1.5 | 1.5 | 1.5 |
| Properties | | | |
| T$_B$ | 133 | 72 | 100 |
| E$_B$ | 510 | 790 | 640 |
| H$_S$ | 52 | 38 | 50 |
| Heat resistance | | | |
| A$_R$ (T$_B$) | 121 | 206 | 141 |
| A$_R$ (E$_B$) | 60 | 44 | 50 |
| ΔH$_S$ | +14 | +23 | +12 |
| Compression set | 96 | 92 | 94 |
| Oil resistance | 15 | 20 | 31 |
| Low-temp. flex. | −15 | −26 | −20 |
| Scorching time | 7 min. 20 sec. | 9 min. | 10 min. 15 sec. |

TABLE 5

|  | Example 10 | Example 11 | Example 12 | Comparative Example 10 | Comparative Example 11 | Comparative Example 12 | Comparative Example 13 |
| --- | --- | --- | --- | --- | --- | --- | --- |
| Feed Composition (parts by weight) | | | | | | | |
| Vinyl acetate | 25 | 25 | 25 | 25 | 25 | 25 | 25 |
| n-Butyl acrylate | 60 | 60 | 60 | 60 | 60 | 60 | 60 |
| Ethylene | 15 | 15 | 15 | 15 | 15 | 15 | 15 |
| Monoethoxyethyl maleate | 7 |  |  |  |  |  |  |
| Monbutoxyethyl maleate |  | 7 |  |  |  |  |  |
| Monomethoxybutyl maleate |  |  | 7 |  |  |  |  |
| Monomethyl maleate |  |  |  | 7 |  |  |  |
| Monoethyl maleate |  |  |  |  | 7 |  |  |
| Monobutyl maleate |  |  |  |  |  | 7 |  |
| Mono 2-ethylhexyl maleate |  |  |  |  |  |  | 7 |
| Properties | | | | | | | |
| T$_B$ | 113 | 98 | 123 | 118 | 103 | 102 | 114 |
| E$_B$ | 220 | 240 | 240 | 250 | 250 | 230 | 220 |
| H$_S$ | 60 | 56 | 63 | 64 | 61 | 60 | 64 |
| Heat resistance | | | | | | | |
| A$_R$(T$_B$) % | 105 | 97 | 87 | 87 | 93 | 95 | 87 |
| A$_R$(E$_B$) | 83 | 88 | 70 | 84 | 88 | 74 | 70 |
| ΔH$_S$ | +12 | +11 | +11 | +8 | +10 | +16 | +18 |
| Compression set | 41 | 42 | 41 | 46 | 48 | 48 | 57 |
| Scorching time | 9 min. 30 sec. | 10 min. 15 sec. | 9 min. 15 sec. | 5 min. 5 sec. | 6 min. | 3 min. 50 sec. | 5 min. 30 sec. |

EXAMPLES 15 AND 16

A series of the polymerization procedures was carried out in the same manner as in Example 1, with the exception that DDM (methylenedianiline) and HMDAC (hexamethylenediamine carbamate) were used as the vulcanizing agent and accelerator, respectively.

EXAMPLES 17 AND 18

A series of the polymerization procedures was carried out in the same manner as in Example 1, with the exception that the press cure and the post cure were carried out in the manner as shown in the remarks in Table 7.

TABLE 6

|  | Comparative Example 14 | Comparative Example 15 | Example 13 | Example 14 |
|---|---|---|---|---|
| Feed Composition (parts by weight) | | | | |
| Vinyl acetate | 20 | 20 | 20 | 20 |
| Ethyl acrylate | 35 | 35 | 35 | 35 |
| n-Butyl acrylate | 30 | 30 | 30 | 30 |
| Ethylene | 15 | 15 | 15 | 15 |
| Monomethoxyethyl maleate | 1 | 20 | 4 | 12 |
| Vulcanizing agents | | | | |
| DDM | 2 | 1 | 2 | 1 |
| Diphenylguanidine | 4 | 2 | 4 | 2 |
| Properties | | | | |
| $T_B$ (kg/cm$^2$) | 61 | 175 | 105 | 168 |
| $E_B$ (%) | 820 | 120 | 400 | 150 |
| $H_S$ | 46 | 77 | 50 | 74 |
| Heat resistance | | | | |
| $A_R(T_B)$ % | 150 | 101 | 135 | 100 |
| $A_R(E_B)$ % | 40 | 88 | 60 | 91 |
| $\Delta H_S$ | +10 | +12 | +8 | +12 |
| Compression set | 85 | 30 | 60 | 34 |
| Scorching time | Over 30 min. | 8 min. 15 sec. | 16 min. 30 sec. | 9 min. |

TABLE 7

|  | Example 15 | Example 16 | Example 17 | Example 18 | Example 19 |
|---|---|---|---|---|---|
| Feed Composition (parts by weight) | | | | | |
| Vinyl acetate | 20 | 20 | 20 | 20 | 20 |
| Ethyl acrylate | 35 | 35 | 35 | 35 | 35 |
| n-Butyl acrylate | 30 | 30 | 30 | 30 | 30 |
| Ethylene | 15 | 15 | 15 | 15 | 15 |
| Monomethoxyethyl maleate | 7 | 7 | 7 | 7 | 7 |
| Vulcanizing agents | | | | | |
| DDM | 0.8 | | 0.8 | 0.8 | 0.8 |
| HMDAC | | 0.8 | | | |
| Diphenylguanidine | 2 | | 2 | 2 | 2 |
| Diorthotolylguanidine | | 2 | | | |
| Properties | | | | | |
| $T_B$ (kg/cm$^2$) | 136 | 142 | 154 | 159 | 176 |
| $E_B$ (%) | 290 | 280 | 220 | 200 | 210 |
| $H_S$ | 60 | 64 | 66 | 68 | 68 |
| Heat resistance | | | | | |
| $A_R(T_B)$ % | 88 | 86 | 98 | 94 | 96 |
| $A_R(E_B)$ % | 75 | 85 | 90 | 90 | 94 |
| $\Delta H_S$ | +14 | +12 | +6 | +4 | +3 |
| Compression set | 35 | 32 | 29 | 25 | 21 |
| Scorching time | 9 min. 30 sec. | 8 min. | 10 min. 30 sec. | 10 min. 30 sec. | 10 min. 30 sec. |
| Remarks | | | press cure 30 minutes | press cure 20 minutes post cure 2 hours | press cure 20 minutes post cure 4 hours |

What is claimed is:

1. An elastomer of acrylic ester type copolymer made up of a monomeric composition consisting of; 100 parts by weight of a mixture of the following three components, (A) 0–50% by weight of a vinyl carboxylate of the formula, $R_1COOCH=CH_2$ wherein $R_1$ is an alkyl group having 1 to 4 carbon atoms, (B) 0–30% by weight of ethylene and (C) 10–100% by weight of an alkyl acrylate of the formula, $CH_2=CHCOOR_2$ wherein $R_2$ is an alkyl group having 1 to 8 carbon atoms and/or an alkoxyalkyl acrylate of the formula, $CH_2=CHCOOR_3OR_4$ wherein $R_3$ is an alkylene group having 1 to 4 carbon atoms and $R_4$ is an alkyl group having 1 to 4 carbon atoms; and 2–15 parts by weight of (D) a monoalkoxyalkyl maleate of the formula,

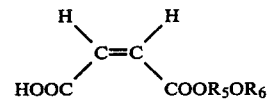

wherein $R_5$ is an alkylene group having 1 to 4 carbon atoms and $R_6$ is an alkyl group having 1 to 4 carbon atoms.

2. The elastomer as set forth in claim 1, wherein said monoalkoxyalkyl maleate is monomethoxyethyl maleate, monoethoxyethyl maleate, monobutoxyethyl maleate or monomethoxybutyl maleate.

3. A rubber product obtained by molding a rubber composition containing the elastomer of acrylic ester copolymer as set forth in claim 1.

4. The rubber product as set forth in claim 3, wherein said molding is carried out using an aliphatic or aromatic primary amine as a vulcanizing agent.

5. The elastomer as set forth in claim 1, wherein said vinyl carboxylate is vinyl acetate.

6. The elastomer as set forth in claim 1, wherein said vinyl carboxylate is vinyl propionate.

7. The elastomer as set forth in claim 1, wherein said component (C) is the alkyl acrylate of the formula: $CH_2=CHCOOR_2$ wherein $R_2$ is an alkyl group having 1 to 8 carbon atoms.

8. The elastomer as set forth in claim 7, wherein said alkyl acrylate is methyl acrylate.

9. The elastomer as set forth in claim 7, wherein said alkyl acrylate is ethyl acrylate.

10. The elastomer as set forth in claim 7, wherein said alkyl acrylate is n-butyl acrylate.

11. The elastomer as set forth in claim 1, wherein said component (C) is the alkoxyalkyl acrylate of the formula: $CH_2=CHCOOR_3OR_4$ wherein $R_3$ is an alkylene group having 1 to 4 carbon atoms and $R_4$ is an alkyl group having 1 to 4 carbon atoms.

12. The elastomer as set forth in claim 11, wherein said alkoxyalkyl acrylate is methoxyethyl acrylate.

13. The elastomer as set forth in claim 11, wherein said alkoxyalkyl acrylate is ethoxyethyl acrylate.

14. The elastomer as set forth in claim 1, wherein said monoalkoxyalkyl maleate is monomethoxyethyl maleate.

15. The elastomer as set forth in claim 1, wherein said monoalkoxyalkyl maleate is monoethoxyethyl maleate.

16. The elastomer as set forth in claim 1, wherein said monoalkoxyalkyl maleate is monobutoxyethyl maleate.

17. The elastomer as set forth in claim 1, wherein said monoalkoxyalkyl maleate is monomethoxybutyl maleate.

* * * * *